United States Patent
Hagidaira et al.

(10) Patent No.: US 6,611,415 B1
(45) Date of Patent: Aug. 26, 2003

(54) FAIL-SAFE CIRCUIT

(75) Inventors: Shinichi Hagidaira, Kani (JP);
Norimasa Amano, Sagamihara (JP);
Kazuhiro Sasaki, Gifu (JP)

(73) Assignees: Kayaba Industry Co., Ltd., Tokyo (JP); Hino Motors, Ltd., Tokyo (JP)

( * ) Notice: Subject to any disclaimer, the term of this patent is extended or adjusted under 35 U.S.C. 154(b) by 359 days.

(21) Appl. No.: 09/676,062

(22) Filed: Sep. 29, 2000

(30) Foreign Application Priority Data

Oct. 1, 1999 (JP) .......................................... 11-280937

(51) Int. Cl.$^7$ ................................................. H01H 9/00
(52) U.S. Cl. .......................... 361/160; 180/405; 91/59; 91/509
(58) Field of Search ................................ 361/160, 167, 361/170, 189, 191, 192, 193, 206; 280/96.1; 180/233, 234, 242, 403, 404, 405, 406, 407, 411, 414, 417, 442; 91/360, 59, 151, 509, 525; 318/563

(56) References Cited

U.S. PATENT DOCUMENTS 3,720,059 A * 3/1973 Schurawski et al. .......... 60/421
4,362,117 A * 12/1982 Mishina ....................... 114/150
4,934,474 A * 6/1990 Sugasawa .................... 180/414
5,147,008 A * 9/1992 Nishimore et al. ......... 180/414

* cited by examiner

Primary Examiner—Ronald W. Leja
(74) Attorney, Agent, or Firm—Steinberg & Raskin, P.C.

(57) ABSTRACT

Provision of a fail-safe circuit which is capable of allowing a sub circuit to operate with reliability when a main circuit encounters abnormal conditions even in a system with only one supply source of pressure oil. A plurality of solenoid type control valves (3, 6) connected to an actuator (1) in parallel have centering springs respectively and are maintained at a neutral position in normal conditions. Each control valve is provided with a supply port, a return port and two actuator ports and is configured such that in the neutral position, the supply port and the return port are communicated with each other and interrupts communication with the actuator ports. And also, while the supply port (3a) of the most upstream control valve (3) is connected to a supply source (P) and the return port (6b) of the most downstream control valve (6) is connected to a tank (T), a return port (3b) of each control valve is connected a supply port (6a) of a control valve (6) located downstream from and adjacent to the connected return port (3b).

4 Claims, 2 Drawing Sheets

Fig. 2 *Prior Art*
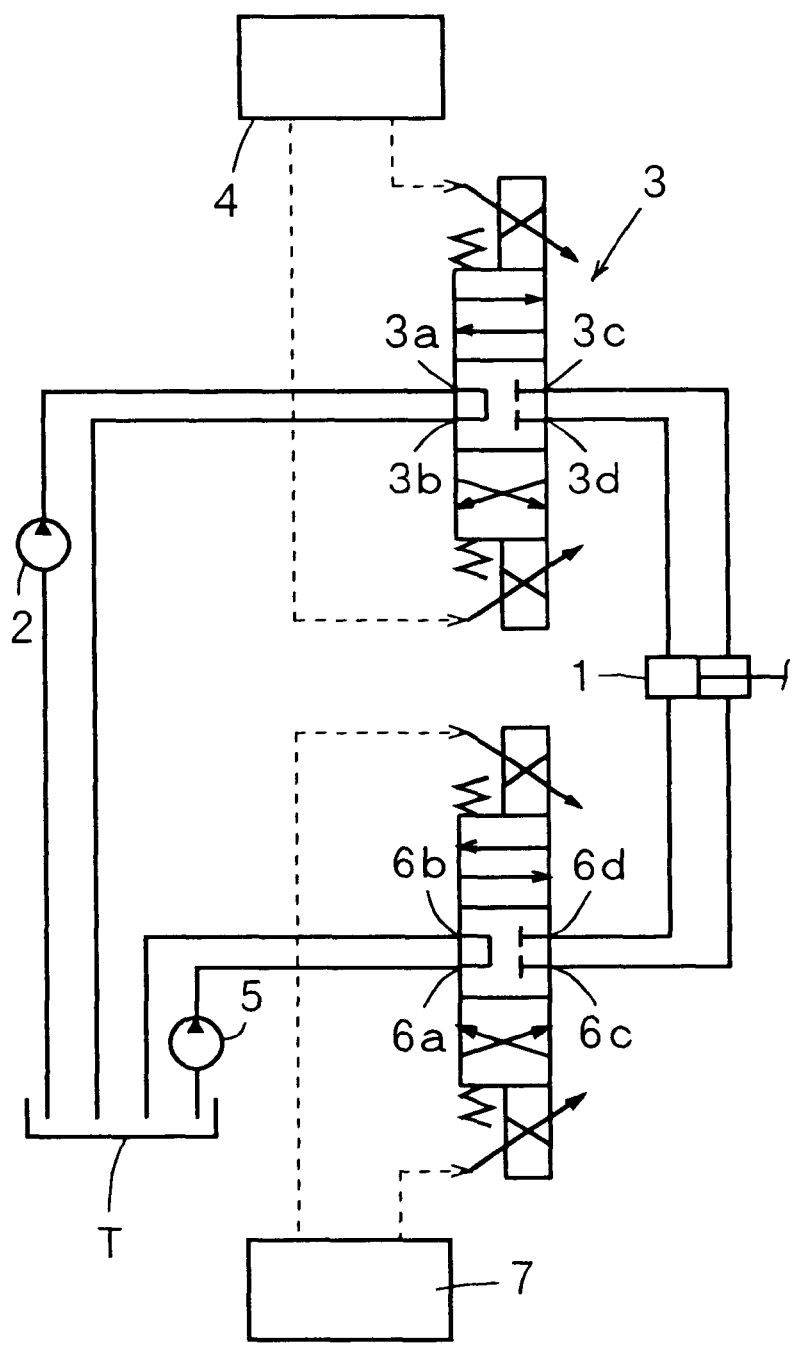

FAIL-SAFE CIRCUIT

BACKGROUND OF THE INVENTION

1. Field of the Invention

This invention relates to a four-wheel steering gear provided with a plurality of hydraulic systems having control valves, in which upon a failure of a main hydraulic system, another hydraulic system is used for controlling an actuator, and more particularly, to a fail-safe circuit for use therein.

2. Description of Related Art

There is a system of connecting a hydraulic pump to an actuator, such as in a four-wheel steering gear, through a control valve so as to control the driving of the actuator. In this case, the control system controls the control valve to control the direction and amount of the flow of pressure oil so as to apply the pressure oil to the actuator.

In such systems, if a control valve is not controlled properly due to a failure of a control system, for example, a circuit between the control system and a control valve is interrupted in order that an actuator is not controlled by an error control signal outputted from the control system.

When the control system has some problems, if the driving of the actuator is stopped immediately, this often causes inconveniences. As shown in FIG. 2, therefore, a system having a dual-redundant control drive has been considered.

In the system, an actuator 1 is connected to two control circuits: a main circuit connecting between the actuator 1 and a main pump 2 through a first control valve 3, and a sub circuit connecting the actuator 1 and a sub pump 5 through a second control valve 6.

The first control valve 3 is provided with a supply port 3a connected to the main pump 2, and a return port 3b connected to a tank T, and also is a proportioning solenoid valve provided with actuator ports 3c and 3d which serves as a supply port or a return port for the actuator 1. Switched positions of the first control valve 3 are controlled by a main CPU 4.

The aforementioned second control valve 6 is also of a proportioning solenoid valve controlled by a sub CPU 7, which is provided with a supply port 6a, return port 6b and actuator ports 6c and 6d as in the case of the first control valve 3.

The second control valve 6 is usually maintained at a neutral position and the first control valve 3 is switched to control the actuator. When the main CPU 4 cannot properly control the first control valve 3 due to a failure of the main CPU 4, the first control valve 3 returns to a neutral position and the sub CPU 7 controls the second control valve 6 to control the driving of actuator 1.

The above conventional system shown FIG. 2 includes the two hydraulic pumps in order that the sub hydraulic circuit is triggered for the operation of the actuator when the main hydraulic system encounters abnormal conditions. The two pumps need a large installation area and costs.

In the case of providing one hydraulic pump and a changeover valve for switching flowing of pressure oil between the main circuit and the sub circuit, the circuits become complicated. Moreover, if the changeover valve suffers a failure, it may be impossible to use the sub circuit provided especially.

SUMMARY OF THE INVENTION

Therefore, it is an object of the present invention to provide a fail-safe circuit designed to allow a sub circuit to reliably operate when a main circuit encounters abnormal conditions even in a supply source of pressure oil.

A first aspect of the present invention is a fail-safe circuit characterized by including: a supply source of pressure oil; an actuator; a plurality of solenoid type control valves provided between the supply source and the actuator and connected to the actuator in parallel, and in that the control valve is provided with a centering spring to maintain at a neutral position in normal times, and with a supply port, a return port and two actuator ports, configured to communicate the supply port and the return port with each other and not to communicate the supply port and the return port with the respective actuator ports at the neutral position, and to connect a supply port of a control valve located at the most upstream end of the control valves to the supply source, and to connect a return port of a control valve located at the most down stream end of the control valves to a tank while the each return port of the control valves is connected to a supply port of a control valve located downstream from and adjacent to the connected return port, and in that the driving of the actuator is controlled while only a specified control valve of the plurality of control valves is switched and other control valves are maintained at the neutral position.

According to the first invention, if one control system encounters abnormal conditions, only by cutting off the failed control system, another control system is triggered.

Moreover, since one pressure oil source constitutes a plurality of control systems, the economics are improved.

A second aspect of the present invention, predicated on the first aspect, is characterized in that the plurality of control valves comprises a first control valve and a second control valve, and characterized by further including a main CPU for controlling the first control valve and a sub CPU for controlling the second control valve, the main CPU stopping the controlling operation for the first control valve when the main CPU itself encounters abnormal conditions, and the sub CPU detecting the abnormal conditions in the main CPU and controlling the driving of the second control valve.

According to the second invention, if the main CPU encounters abnormal conditions, it is possible that the sub CPU controls the second control valve to continue the control for driving the actuator.

A third aspect of the present invention, predicated on the first and second aspects, is characterized in that the plurality of control valves comprises a first control valve and a second control valve, and characterized by further including a main CPU for controlling the first control valve and a sub CPU for controlling the second control valve, in which the main CPU stops the controlling operation for the first control valve when detecting abnormal conditions in the first control valve, and the sub CPU detects a halt on the controlling operation of the main CPU and controls the driving of the second control valve.

According to the third invention, if the first control valve encounters abnormal conditions even though the main CPU operates normally, it is possible that the main CPU stops the controlling operation and the sub CPU starts the controlling operation for the second control valve to continue the control for driving the actuator.

A fourth aspect of the present invention is characterized by a cut-off valve connected upstream or downstream from the control valve.

According to the fourth invention, if the control valve fails mechanically and does not return to the neutral position, it is possible that the cut-off valve cuts off the communication between the actuator port of the failing control valve and the actuator.

BRIEF DESCRIPTION OF THE DRAWINGS

FIG. 2 is a schematic circuit diagram of a conventional example.

DETAILED DESCRIPTION OF THE PREFERRED EMBODIMENTS

Figure 1:
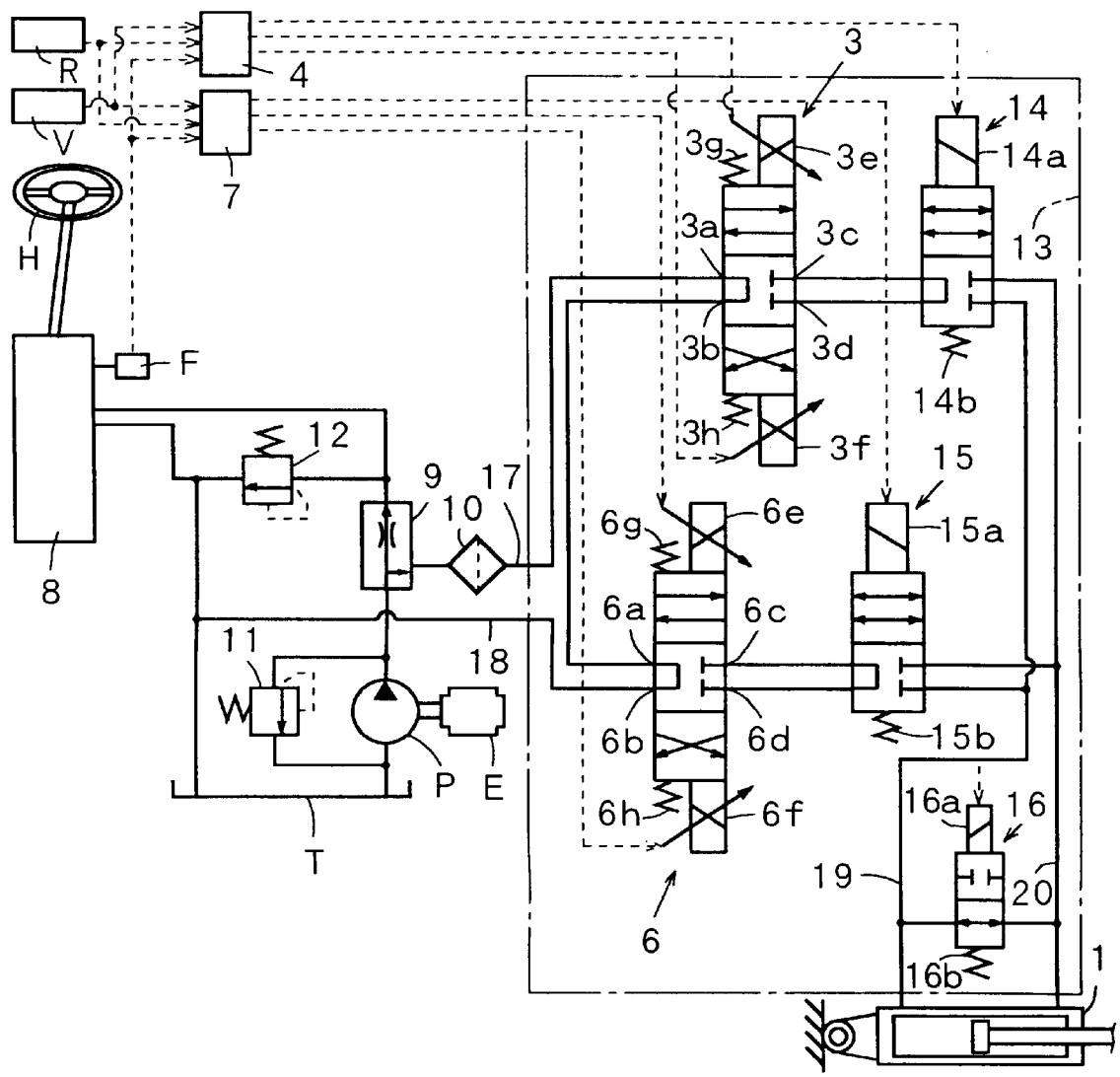
FIG. 1 is a schematic circuit diagram of an embodiment according to the present invention.

FIG. 1 illustrating an embodiment is a schematic circuit diagram of a four-wheel steering gear including a fail-safe circuit of the present invention.

The gear drives an actuator 1 for steering rear-wheels and a power steering 8 with a pump P driven by rotation of an engine E.

Oil discharged from the pump P as a pressure-oil source is divided into the actuator 1 and the power steering 8 through a priority valve 9. In this event, the flow applied to the above power steering 8 is secured preferentially.

It should be noted that in the drawing, reference numeral 10 indicates a filter, reference numerals 11, 12 indicate relief valves and reference character H indicates a steering wheel connected to the power steering 8.

A pump line 17 is provided for supplying the oil discharged from the pump P, and a tank line 18 is provided for returning the pressure oil to a tank T. The pump line 17 and the tank line 18 are connected through a valve unit 13 to the actuator 1. The valve unit 13 includes a first control valve 3, a second control valve 6, a first cut-off valve 14, a second cut-off valve 15 and a fail-safe valve 16.

Each valve making up the above valve unit 13 is controlled by a main CPU 4 and a sub CPU 7 which will be described later.

The first and second control valves 3 and 6 are for controlling a direction and amount of flowing of the pressure oil applied to the actuator 1, which has the same structure as that of the conventional control valve. However, the valves differ in a connecting manner from that of the conventional example.

The first control valve 3 has a supply port 3a connected to the above pump line 17, and a return port 3b connected to a supply port 6a of the second control valve 6. A return port 6b of the second control valve 6 is connected to the aforementioned tank line 18.

The first and second control valves 3 and 6 are solenoid valves having centering springs 3g, 3h and 6g, 6h, respectively, each of which is designed to return to the neutral position shown in FIG. 1 by an effect of the centering spring in normal times when each of solenoids 3e, 3f, 6e and 6f are not excited.

The first control valve 3 has actuator ports 3c, 3d connected to lines 19, 20 through the first cut-off valve 14. The lines 19, 20 serve as oil passages of supplying to and discharging from the actuator 1.

The lines 19 and 20 are also connected through the second cut-off valve 15 to actuator ports 6c, 6d of the second control valve 6. In other words, the first control valve 3 and the second control valve 6 are connected to the actuator 1 in parallel.

The aforementioned first and second cut-off valves 14 and 15 are switched to respective communicating positions while solenoids 14a and 15a are excited, and maintained at respective cut-off positions shown in FIG. 1 by spring forces of springs 14b and 15b while the solenoids 14a and 15a are not excited.

In addition, between the lines 19 and 20, the fail-safe valve 16 is connected. The fail-safe valve 16 excites a solenoid 16a to keep a cut-off state while the gear is normally controlled. However, when the actuator 1 or the valve unit 13 encounters abnormal conditions, the fail-safe valve 16 is switched to a communicating state shown in FIG. 1. While the fail-safe valve 16 is maintained at the communicating position to communicate between the line 19 and the line 20, the actuator 1 is in a non-control state.

The above fail-safe valve 16 is maintained at the communicating position shown in FIG. 1 by a spring 16b while the solenoid 16a is not excited, and switched to the cut-off position when the solenoid 16a is excited, which is controlled by the main CPU 4 and the sub CPU 7.

The circuit illustrated in FIG. 1 is provided with the main CPU 4 and the sub CPU 7 for controlling the above valve unit 13.

The main CPU 4 and the sub CPU 7 are connected to a power source not shown, vehicle speed sensor V, front-wheel steering angle sensor , and rear-wheel steering angle sensor R, to control each valve in response to an input signal supplied from each sensor.

The main CPU 4 excites the solenoid 3e or 3f to change the first valve 3 from the neutral state shown in FIG. 1 to either a upper valve position or a lower valve position, and also adjusts the degree of valve opening by changing values of current applied to the solenoids 3e, 3f. In addition, the main CPU 4 can perform the switchings of the first cut-off valve 14 and the fail-safe valve 16.

The sub CPU 7 controls the fail-safe valve 16 as well as the second control valve 6 and the second cut-off valve 15, with the same controlling manner as that of the main CPU 4.

The main CPU 4 and the sub CPU 7 exchange signals with each other for determining if each CPU operates normally.

Operations in the embodiment will be described below.

Generally, while maintaining the second control valve 6 and second cut-off valve 15 at the neutral positions shown in FIG. 1, the main CPU 4 controls only the control valve 3 to switch the pressure oil to apply to the actuator 1. That is to say the first control valve 3 corresponds to a specified control valve of the present invention. When the first control valve 3 is switched to control the actuator 1, the main CPU 4 excites the solenoid 14a of the cut-off valve 14 to switch the cut-off valve 14 from the position shown in FIG. 1 to the communicating position, and also excites the solenoid 16a to switch the fail-safe valve 16 from the position shown in FIG. 1 to the position at which the communication between the line 19 and the line 20 is cut off.

For example, when the first control valve 3 is switched to the valve position of the upper side in FIG. 1, pressure oil is supplied from the pump passage 17 to the supply port 3a of the first control valve 3, then to the actuator port 3c, then to the first cut-off valve 14, then to the line 20, and finally to the actuator 1.

On the other hand, the return oil flows back from the actuator 1, to the line 19, then to the first cut-off valve 14, then to the actuator port 3d of the first control valve 3, then to the return port 3b, then to the supply port 6a of the second control valve 6, then to the return port 6b thereof, then to the return passage 18, and finally to the tank T.

The above main CPU 4 controls the degree of opening and the switch position of the first control valve 3 in response to a signal supplied from each of the sensors V, R and F so as to control the amount and the direction of the flowing of pressure oil applied to the actuator 1.

In the above state, if the main CPU 4 encounters abnormal conditions, the control valve 3 is not controlled correctly. In such event, the main CPU 4 halts outputting of the control signals for each valve of the valve unit 13. For example, only when the control program of the main CPU 4 is normally operated, a circuit capable of applying an excitation current to the solenoid of each valve may be provided.

As such, if the main CPU 4 halts, each solenoid of the first control valve 3, cut-off valve 14 and fail-safe valve 16 is not excited so that each valve is returned to the cut-off position by the effect of the spring.

On the other hand, upon detecting the shutdown of main CPU 4 due to occurrence of abnormality, the sub CPU 7 starts to control the valve unit 13. Specifically, the sub CPU 7 excites each solenoid of the second control valve 6, cut-off valve 15, and fail-safe valve 16. The solenoid 15a is excited so that the cut-off valve 15 is switched to the communication position, and the solenoid 6e or 6f is excited so that the second control valve 6 is controlled.

As a result, the pressure oil is supplied from the pump passage 17 to the supply port 3a of the first control valve 3, then to the return port 3b thereof, then to the supply port 6a of the second control valve 6, then to the actuator port 6c or 6d, then to the second cut-off valve 15, then to the line 19 or 20, and finally to the actuator 1.

The return oil flows back from the actuator 1 to the line 19 or 20, then to the second cut-off valve 15, then to the port 6d of the second control valve 6, then to the return port 6b, then to the return passage 18 and finally to the tank T.

As described above, if the main passage controlled by the main CPU 4 is put out of commission, the sub CPU 7 immediately controls the second control valve 6 so as to control the actuator 1.

It should be mentioned that in the above embodiment, the case where the main CPU 4 encounters abnormal conditions has been explained, but if an electric system of the first control valve 3 fails while the main CPU 4 operates normally, the main CPU 4 detects the failure of the first control valve 3 and voluntarily stops its controlling operation. When the controlling operation of the main CPU 4 is stopped, the sub CPU 7 controls the second control valve 6 as in the aforementioned case.

Even when the first control valve 3 mechanically fails and does not return to the neutral position although the solenoid is not excited, if the main CPU 4 stops, the first cut-off valve 14 is switched to the cut-off position. Hence, it is possible that the sub CPU 7 controls the second control valve 6 to continue controlling the actuator 1.

The embodiment of the present invention forms the two hydraulic control systems. Therefore, if one of the control systems encounters the abnormal conditions, the other control system can substitute for the one to continue the control operation. Moreover, since the pressure oil source is one pump P, it is possible to reduce costs as compared with provision of two pumps as in the case of the conventional example.

In the conventional system, in the case where a changeover valve is used for a plurality of hydraulic systems to switch among them for application of pressure oil, if the one changeover valve fails, the reserve circuit cannot be used. However, in the present invention, only by cutting off control for a control valve or cut-off valve in the failing system, the valve is switched to the cut-off position and thus the controlling for the actuator can be changed from the failing circuit to a new circuit.

In the aforementioned embodiment, the two control valves are used, but the number of control valves may be larger than three. In this case, in order from upstream, a return port of an upstream valve can be connected to a supply port of a directly downstream valve. In this case, the number of control valves corresponds to the number of hydraulic control systems, so that the number of reserve circuits is increased by an increased number of hydraulic control systems, but the number of pressure oil sources may be one.

However, rather than provision of a multitude of control valves or CPUs, it is more practical to use only two systems of the main and sub systems to check a cause of a failure in the main system while the sub system is being operated or to make preparations for a next step for addressing the failure.

In the above embodiment, each cut-off valve is arranged downstream each control valve in series, but the cut-off valve may be arranged upstream from the control valve or may be not provided always.

In addition, the CPU electrically controls all the valves, but the cut-off valve and fail-safe valve can be switched manually.

EXPLANATION OF REFERENCE NUMERALS

1 ACTUATOR
3 FIRST CONTROL VALVE
3a SUPPLY PORT
3b RETURN PORT
3c ACTUATOR PORT
3d ACTUATOR PORT
3e SOLENOID
3f SOLENOID
3g SPRING
3h SPRING
4 MAIN CPU
6 SECOND CONTROL VALVE
6a SUPPLY PORT
6b RETURN PORT
6c ACTUATOR PORT
6d ACTUATOR PORT
6e SOLENOID
6f SOLENOID
6g SPRING
6h SPRING
7 SUB CPU
14 CUT-OFF VALVE
15 CUT-OFF VALVE
P PUMP
T TANK

What is claimed is:

1. A fail-safe circuit comprising:
a supply source of pressure oil;
an actuator; and
a plurality of solenoid type control valves provided between the supply source and the actuator and connected to said actuator in parallel, said control valve being provided with a centering spring to maintain at a neutral position in normal times, and with a supply port, a return port and two actuator ports, configured to communicate said supply port and said return port with each other and not to communicate said supply port and said return port with said respective actuator ports at the neutral position, a supply port of a control valve located at the most upstream end of said control valves being connected to said supply source, a return port of a control valve located at the most downstream end of the said control valves being connected to a tank while said each return port of said control valves is connected a supply port of a control valve located downstream from and adjacent to the connected valve, wherein the driving of said actuator is controlled while only a specified control valve of said plurality of control valves is selected and other control valves are maintained at the neutral position.

2. The fail-safe circuit according to claim 1, wherein said plurality of control valves comprises a first control valve and a second control valve, further comprising a main CPU for controlling the first control valve and a sub CPU for controlling the second control valve, said main CPU stopping the controlling operation for said first control valve when said main CPU itself encounters abnormal conditions, and said sub CPU detecting the abnormal conditions in said main CPU and controlling the driving of said second control valve.

3. The fail-safe circuit according to claim 1 wherein said plurality of control valves comprises a first control valve and a second control valve, further comprising a main CPU for controlling the first control valve and a sub CPU for controlling the second control valve, said main CPU stopping the controlling operation for said first control valve when detecting abnormal conditions in said first control valve, and said sub CPU detecting a halt on the controlling operation of said main CPU and controlling the driving of said second control valve.

4. The fail-safe circuit according to claim 1, wherein a cut-off valve connected upstream or downstream from said control valve.

* * * * *